(12) United States Patent
Chbat et al.

(10) Patent No.: US 8,751,416 B2
(45) Date of Patent: Jun. 10, 2014

(54) METHOD AND APPARATUS FOR DERIVING PROBABILISTIC MODELS FROM DETERMINISTIC ONES

(75) Inventors: Nicolas W. Chbat, White Plains, NY (US); Kees Van Zon, Cold Spring, NY (US)

(73) Assignee: Koninklijke Philips N.V., Eindhoven (NL)

( * ) Notice: Subject to any disclaimer, the term of this patent is extended or adjusted under 35 U.S.C. 154(b) by 1345 days.

(21) Appl. No.: 12/439,617

(22) PCT Filed: Aug. 28, 2007

(86) PCT No.: PCT/IB2007/053460
§ 371 (c)(1),
(2), (4) Date: Mar. 2, 2009

(87) PCT Pub. No.: WO2008/026167
PCT Pub. Date: Mar. 6, 2008

(65) Prior Publication Data
US 2010/0017349 A1  Jan. 21, 2010

Related U.S. Application Data

(60) Provisional application No. 60/823,716, filed on Aug. 28, 2006.

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | |
|---|---|---|---|
| 7,480,640 B1* | 1/2009 | Elad et al. | 706/14 |
| 2006/0106530 A1* | 5/2006 | Horvitz et al. | 701/117 |
| 2007/0106626 A1* | 5/2007 | Mundie et al. | 706/20 |

OTHER PUBLICATIONS

A multi-agent intelligent for medical knowledge Rosa M. Vicari, Cecilia D. Floresa, Andre, M. Silvestre, Louise J. Seixas, Marcelo Ladeira, Helder Coelho.*
Bayesian probabilistic extensions of a deterministic classification model Iwin Leenen and Iven Van Mechelen . K.U.Leuven, Belgium Andrew Gelman Columbia University, New York!*
Editorial Bayesian networks in biomedicine and health-care Artificial Intelligence in Medicine 30 (2004) 201-214.*
A multi-agent intelligent environment for medical knowledge Rosa M. Vicaria,*, Cecilia D. Floresa, André M. Silvestrea, Louise J. Seixasb, Marcelo Ladeirac, Helder Coelhod aInformatics Institute, Federal University of Rio Grande do Sul, Caixa Postal: 15064 91501-970, Porto Alegre, Rio Grande do Sul, Brazil bPost-graduate Course on Computer and Edu.*
Friedman et al, "Learning the Structure of Dynamic Probabilistic Networks", Uncertainty in Artificial Intelligence, Proceedings of the Conference Jan. 1, 1998, pp. 139-147.
Leenen, "Bayesian Probabilistic Extensions of a Deterministic Classification Model", Computational Statistics, vol. 15, No. 3, Dec. 31, 2000, pp. 355-372.
Editorial: "Bayesian Networks in Biomedicine and Health-Care", Artificial Intelligence in Medicine, vol. 30, Dec. 31, 2004, pp. 201-214.

(Continued)

*Primary Examiner* — Kakali Chaki
*Assistant Examiner* — Ababacar Seck

(57) ABSTRACT

A Dynamic Bayesian Network provides models that provides emulation of patient data.

8 Claims, 4 Drawing Sheets

(56) References Cited

OTHER PUBLICATIONS

Ursino, "A Methematical Model of the Carotid Baroregulation in Pulsating Conditions", IEEE Transactions on Biomedical Engineering, vol. 46, No. 4, Apr. 1999, pp. 382-392.

Hulst, "Modeling Physiological Processes With Dynamic Bayesian Networks", PHD Thesis TU Delft, Netherlands, Aug. 31, 2006, pp. 1-94.

* cited by examiner

METHOD AND APPARATUS FOR DERIVING PROBABILISTIC MODELS FROM DETERMINISTIC ONES

CROSS-REFERENCE TO RELATED APPLICATIONS

The present application is related to concurrently filed U.S. patent application Ser. No. 12/439,610 entitled DYNMAMIC BYASIAN NETWORK FOR EMULATING CARDIOVASCULAR FUNCTION. The disclosure of this application is specifically incorporated herein by reference.

Modeling of dynamic systems can be useful in predicting results or outcomes. One type of modeling is known as deterministic modeling. In deterministic modeling, variables are determined for a dynamic system. A common use of models is predicting the future behavior of real-life systems. Parameters can be tuned to make a generic model represent a specific system. Once its parameters are set, a deterministic model will produce exact values of the variables of interest, whereas a probabilistic model will produce the probabilities of these variables having certain values.

Another type of model is a probabilistic model. However, by definition, the probabilistic solutions are less precise than a deterministic solution. An important advantage of a probabilistic model is its natural ability to handle missing and uncertain input variables. The probabilities of a probabilistic model inherently reflect the uncertainties in its variables, so inaccuracies in the input variables don't affect the probability distributions of the output variables by much. Likewise, when input variables are missing, their probability distributions are still known and can be used to calculate the probability distributions of the output variables.

What is needed, is a method and apparatus of modeling that overcome at least the shortcomings described above.

In a representative embodiment, a system for deriving a probabilistic model from a deterministic model includes: a validated deterministic model (VDM); and a machine learning algorithm (MLA) operative to receive data from the VDM and to generate the probabilistic model.

In another representative embodiment, a system for emulating variables in a person, comprises: a validated deterministic model (VDM) operative to provide patient data; and a machine learning algorithm (MLA) operative to receive patient data from the VDM and to generate the probabilistic model. The input variables are provided to the probabilistic model to provide the emulating variables.

Figure 1:
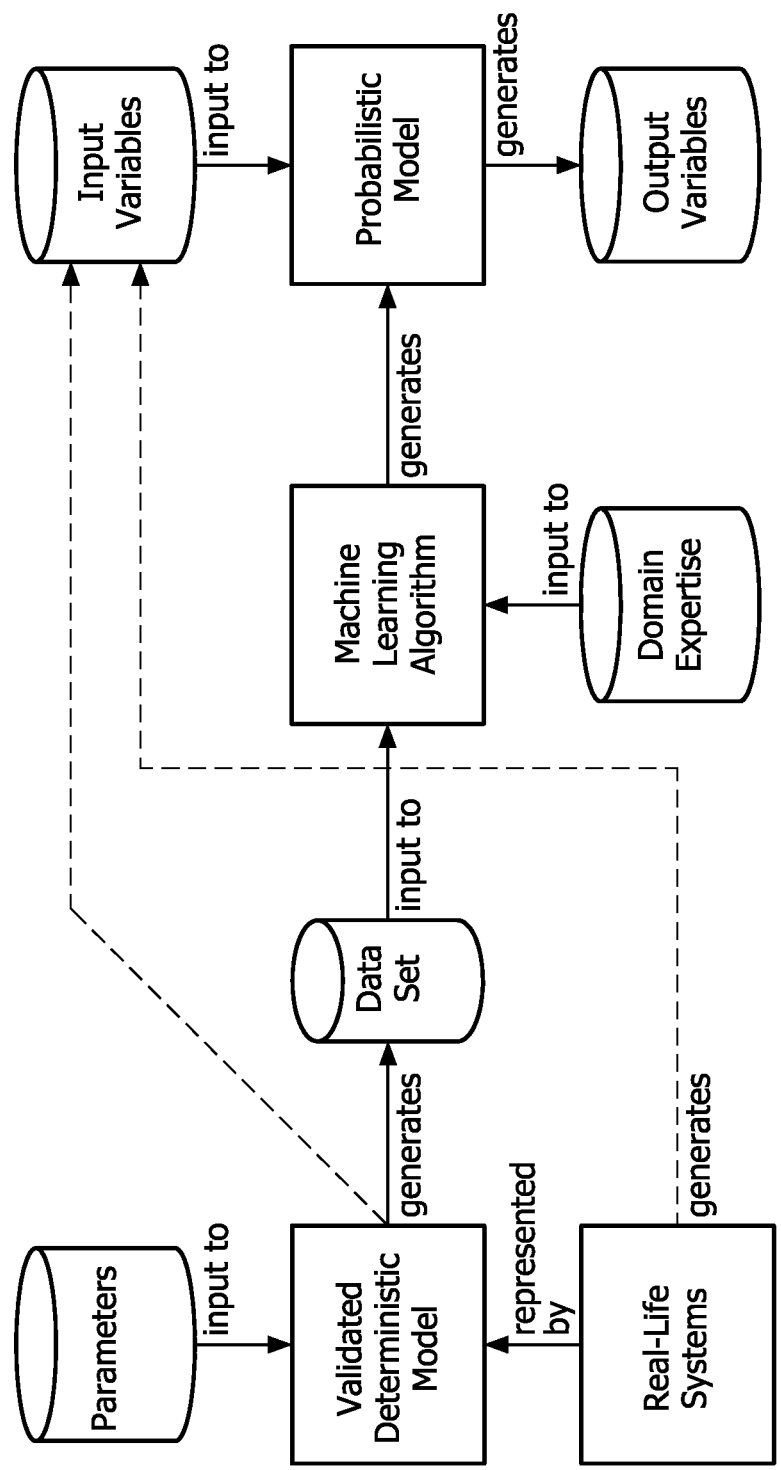
FIG. 1 is a conceptual representation of a system for deriving a probabilistic model from a deterministic model in accordance with a representative embodiment.

In the following detailed description, for purposes of explanation and not limitation, illustrative embodiments disclosing specific details are set forth in order to provide a thorough understanding of the present teachings. Moreover, descriptions of well-known devices, hardware, software, firmware, methods and systems may be omitted so as to avoid obscuring the description of the illustrative embodiments. Nonetheless, such hardware, software, firmware, devices, methods and systems that are within the purview of one of ordinary skill in the art may be used in accordance with the illustrative embodiments. Finally, wherever practical, like reference numerals refer to like features.

The detailed description which follows presents methods that may be embodied by routines and symbolic representations of operations of data bits within a computer readable medium, associated processors, microprocessors, general purpose personal computers, manufacturing equipment, configured with data acquisition cards and the like. In general, a method herein is conceived to be a sequence of steps or actions leading to a desired result, and as such, encompasses such terms of art as "routine," "program," "objects," "functions," "subroutines," and "procedures."

The apparatuses and methods of the illustrative embodiments are described in implementations of testing of the human cardiovascular system. It is emphasized that this is merely illustrative; and it is emphasized that the apparatuses and methods may be implemented in other modeling environments. For example, one of ordinary skill in the art, after reviewing the present teachings, may adapt the teachings to the testing of other physiological systems. Moreover, the apparatuses and methods may be implemented in veterinary testing as well in the interest of treating animals.

FIG. 1 is a conceptual representation of a system 100 for deriving a probabilistic model from a deterministic model in accordance with a representative embodiment. The system 100 includes a validated deterministic model (VDM) 101, which represents a real-life system(s) 102. The VDM 101 garners parameters 103 as shown. The output of the VDM 101 is sets of data 104, which are provided to a machine learning algorithm 105. The algorithm 105 uses the data 104 and domain expertise 106 to generate a probabilistic model 107 via a machine learning algorithm (MLA). The probabilistic model 107 receives input variables 108 and generates output variables. Thus, the deterministic model 101 is used to derive a probabilistic model 107.

In a representative embodiment, the system 100 is used to emulate certain physiological variables in the human body. For instance, the cardiovascular system (CV) may be modeled by the system 100 to emulate normally invasive variables such as CardiOutput. Again, it is emphasized that this is merely an illustrative application of the system 100.

The VDM 101 is illustratively a DBN. Such networks may be derived from a system of ordinary differential equations (ODE) and may be as described, for example in "Modeling Physiological Processes using Dynamic Bayesian Networks" by J. Hulst (Thesis in Partial Fulfillment for the Requirements of Master of Science Degree at the University of Pittsburgh (2006)), the disclosure of which is specifically incorporated herein by reference. Moreover, the ODEs of the model may be represented in MatLab or other commercially available software.

The real-life systems 102 are physiological systems. Variables are selected from a number of variables that can affect the function under examination. For example, in the illustrative embodiment in which the cardiovascular system is modeled, and the output is the heart's ejection fraction (EF), the variables that most immediately affect the EF are provided to the VDM.

As noted, the parameters 103 further define the variables. Parameters are typically control values that influence variables. Variables are solved for by the model equations or rules, and represent system states that could change with time. As an example, in a cardiovascular system, a vessel compliance is a parameter; while the aortic blood pressure and flow are variables.

These parameters 103 may be for example, coefficients of differential equations of the VDM. Generally, the parameters 103 relate to the interrelationship (e.g., weighting) of different variables in the deterministic model being used. In certain embodiments, these parameters may be, for example, based on clinical data from a class of patients, or based on the severity of a particular variable as it relates to a medical condition.

The VDM 101 provides data to for use in the MLA 105. These data are deterministic data garnered from the model and are useful in probabilistic calculations of a desired variable. As will be appreciated and as described more fully herein, in order to more generally or comprehensively determine probabilities of variables or sets of variables, the greater the amount of data provided, the more accurate the result. Moreover, the data 104 provide a greater degree of reliability than can be garnered directly from a probabilistic model.

The domain expertise 106 includes knowledge such as provided by an expert in the domain of the real-life system that is being modeled, for example, a physician. Notably, this expertise can be used to define the nodes and their interrelationships of a model such as described in the cross-referenced application. It can also be used to establish the numerical values of the parameters of the probabilistic model. As known from literature however, this is time consuming and prone to introduce inaccuracies. The current invention therefore proposes to learn these numerical parameters from the data provided by the VDM by means of the MLA.

The MLA 108 generates the probabilistic model 107 from the data. The MLA 108 may, for example, be as described in the referenced thesis to Hulst and may be the learning algorithm of the GeNIe tool of the University of Pittsburgh, Pa. USA.

Figure 2:
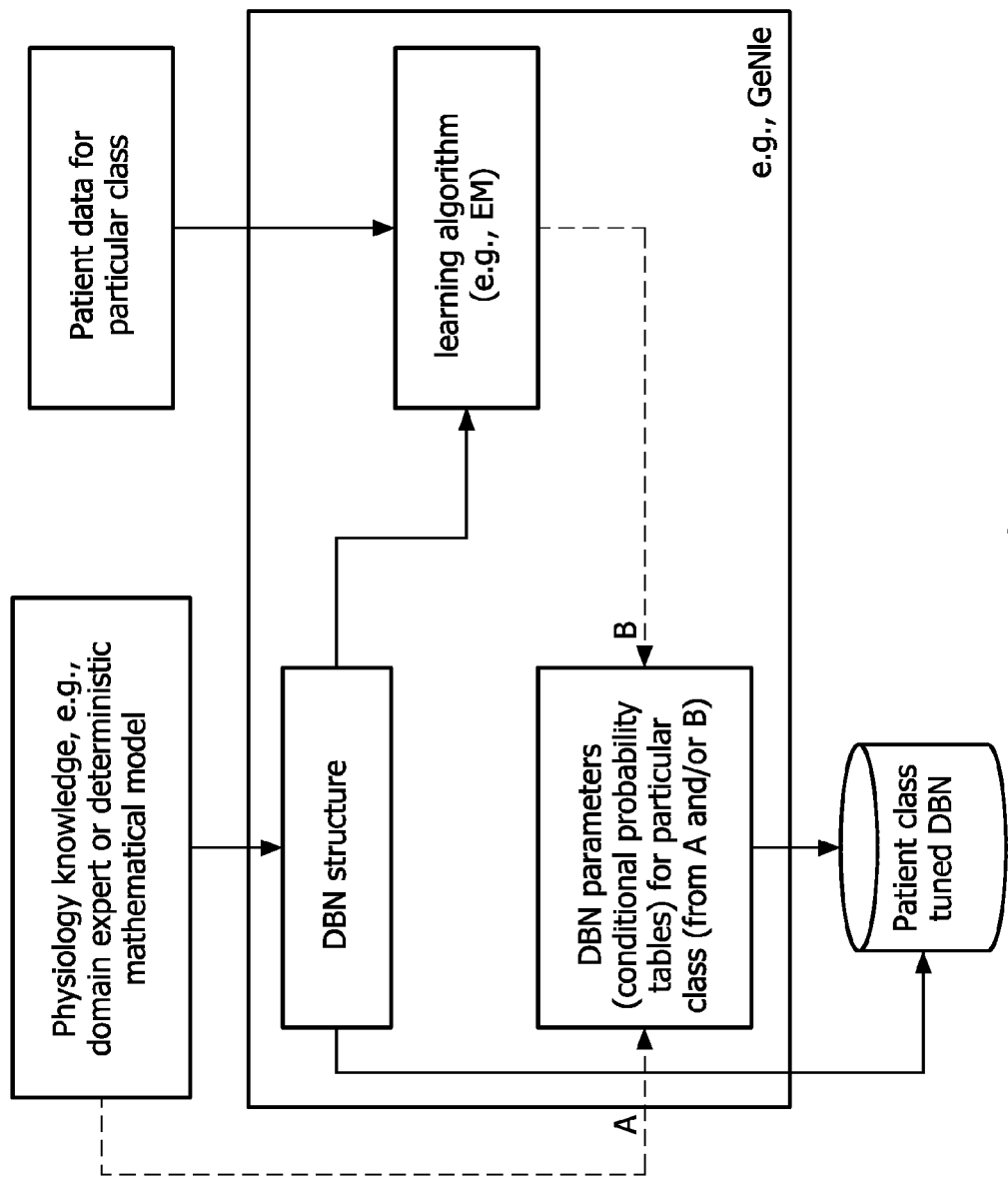
FIG. 2 is a flow chart representing the creation of a dynamic Bayesian network (DBN) in accordance with a representative embodiment.

FIG. 2 is a flow chart representing the creation of a dynamic Bayesian network (DBN) in accordance with a representative embodiment. Certain details of the representative embodiment are as described in conjunction with FIG. 1 and thus are not repeated. Physiological knowledge from, for example, a physician, is provided at step 201. The knowledge is used to provide the DBN structure. It may also be used to provide the DBN parameters (A). Beneficially however, these parameters can, via machine learning algorithm 108, instead be derived from patient data provided by VDM 101. Note that it is possible to combine the latter (B) with the former (A), is known to those skilled in the art. Moreover parameters A can be established once for an entire population of patients, or multiple times for multiple classes of patients. The latter allows the DBN to be adapted to different types of patients, for example, patients with various cardiovascular pathologies. Ultimately, the DBN is provided as (for example) a file representing the variables, their probabilistic relationships, and the strengths of these relationships as defined by the parameters.

Figure 3:
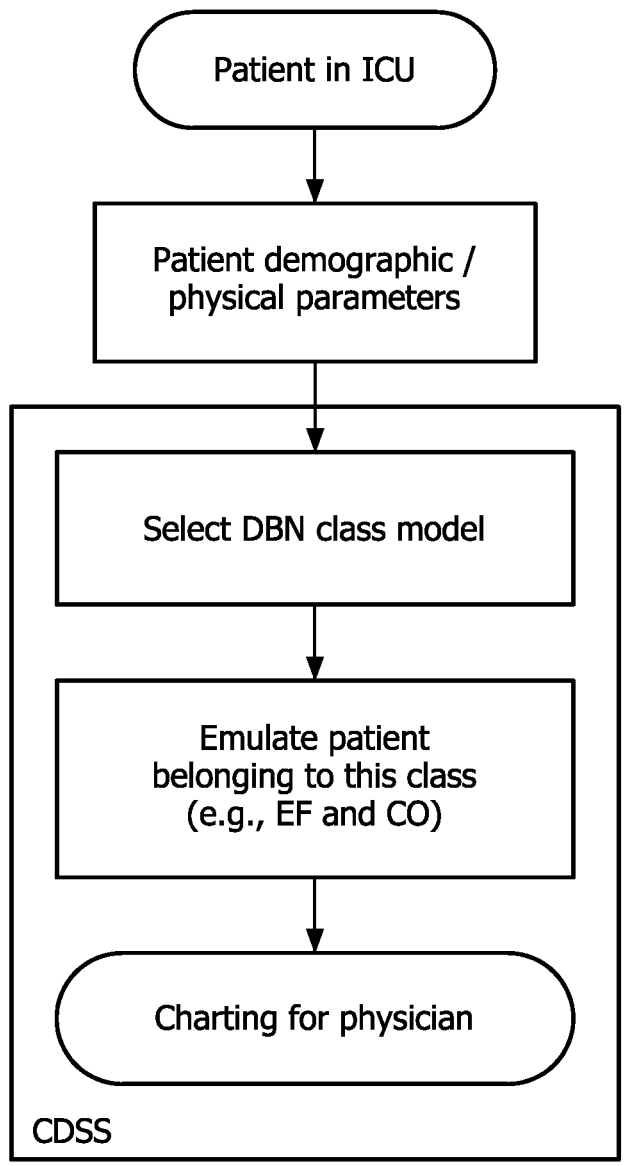
FIG. 3 is a flow chart representing the deployment of a DBN in accordance with a representative embodiment.

FIG. 3 is a flow chart representing the deployment of a DBN in accordance with a representative embodiment. As certain details of the system and method of FIGS. 1 and 2 are common to the deployment described presently, these details are omitted to avoid obscuring the present description.

In the present illustrative embodiment, data measured from a patient in the ICU are provided to the probabilistic model, shown as 301. In addition, parameters indicating the type (or classification) of the current patient can be provided, for example, a parameter indicating whether or not the patient has previously suffered a myocardial infarction. The probabilistic model 109 receives these data, selects the appropriate class of parameters for the DBN model, and via the model, emulates the patient according to the patient class. For example, the ejection fraction or cardiac output may be emulated. The emulated data are then provided to the health care provider via a chart or other representation.

Figure 4:
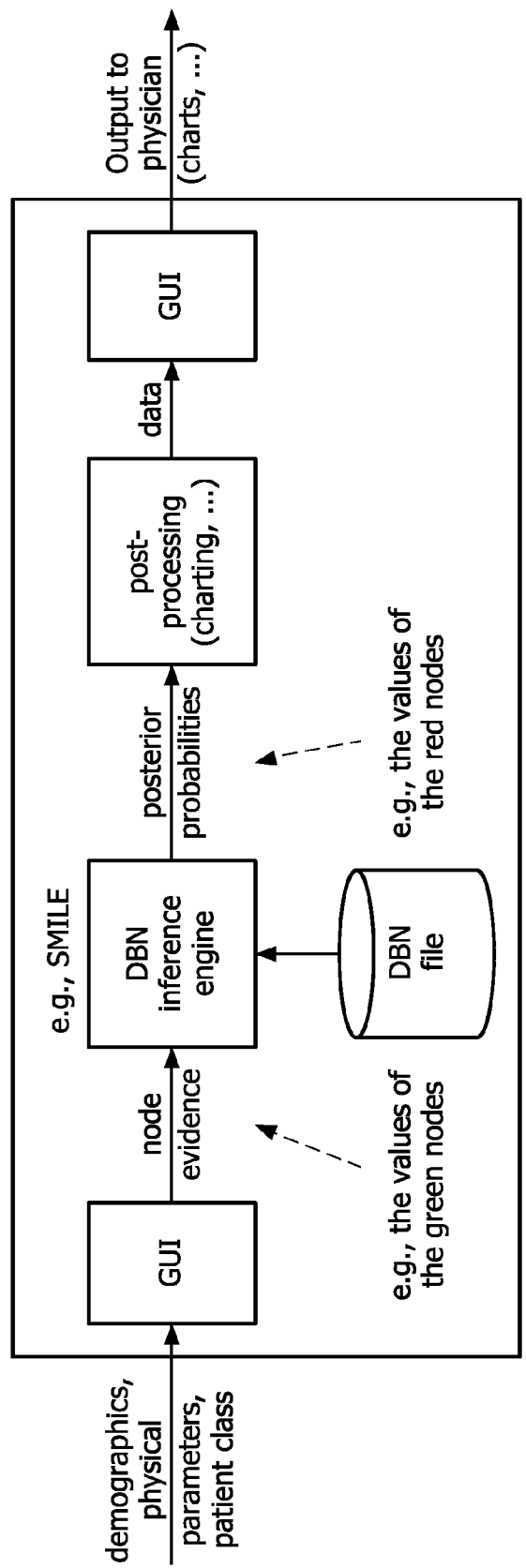
FIG. 4 is a conceptual representation of a system for emulating patient data using a DBN in accordance with a representative embodiment.

FIG. 4 is a system that implements the above concepts so as to provide patient emulation to a physician or other health care provider. As certain details of the system and method of FIGS. 1 and 2 are common to the deployment described presently, these details are omitted to avoid obscuring the present description.

At an input side, via a graphic user interface (GUI) or other suitable interface mechanism, parameters are provided for a particular patient. These data may include patient specific data, such as heart rate and blood pressure, plus patient class data, and other similar data. With these data, and the DBN file, which is for example represented in a file, the DBN inference engine calculates the desired data.

The output probabilities provided by the DBN inference engine can be post-processed for suitable presentation to the user. This may be carried out via standard software to provide charts, tables, etc. Finally, another GUI provides the output in form for the health care provider's ready use.

While representative embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A system for deriving a probabilistic model from a deterministic model, comprising:
    a validated deterministic model (VDM), wherein the VDM is a dynamic Bayesian Network (DBN) which is derived from a system of ordinary differential equations, the DBN being provided as a file representing variables and parameters, probabilistic relationships of the variables and strengths of the probabilistic relationships as defined by the parameters; and
    a machine learning algorithm (MLA) operative to receive data from the VDM and to generate the probabilistic model, wherein the probabilistic model receives the data, selects an appropriate class of parameters for the DBN, and emulates a patient according to a patient class.

2. A system as claimed in claim 1, wherein the MLA further receives other parameters.

3. A system as claimed in claim 1, wherein the probabilistic model receives input variables and provides output variables during deployment.

4. A system for emulating variables in a person, comprising:
    a validated deterministic model (VDM) operative to provide patient data, wherein the VDM is a dynamic Bayesian Network (DBN) which is derived from a system of ordinary differential equations, the DBN being provided as a file representing variables and parameters, probabilistic relationships of the variables and strengths of the probabilistic relationships as defined by the parameters; and
    a machine learning algorithm (MLA) operative to receive patient data from the VDM and to generate the probabilistic model, wherein input variables are provided to the probabilistic model to provide the emulating variables and wherein the probabilistic model receives the patient data, selects an appropriate class of parameters for the DBN, and emulates a patient according to a patient class.

5. A system as claimed in claim 4, wherein the MLA further receives other parameters.

6. A system as claimed in claim 4, wherein the input variables provided to the probabilistic model are measured patient data.

7. A system as claimed in claim 4, wherein the MLA receives parameters based on patient information.

8. A system as claimed in claim 7, wherein the patient information includes patient class-specific data.

* * * * *